United States Patent

Nomura et al.

[11] Patent Number: 5,881,299
[45] Date of Patent: Mar. 9, 1999

[54] SELECTIVELY REMOVING POWER FROM MULTIPLE DISPLAY AREAS OF A DISPLAY UNIT

[75] Inventors: Hiroshi Nomura; Eiji Okazawa, both of Tokyo, Japan

[73] Assignee: Kabushiki Kaisha Toshiba, Kawasaki, Japan

[21] Appl. No.: 721,020

[22] Filed: Sep. 26, 1996

[30] Foreign Application Priority Data

Nov. 22, 1995 [JP] Japan .................................. 7-304202

[51] Int. Cl.⁶ ...................................................... G06F 1/32
[52] U.S. Cl. .............................. 395/750.06; 395/750.03; 345/103; 345/212
[58] Field of Search ..................................... 345/103, 212, 345/1, 115, 116, 213; 395/750.01, 750.03, 750.04, 750.06

[56] References Cited

U.S. PATENT DOCUMENTS

| | | | |
|---|---|---|---|
| 4,679,043 | 7/1987 | Morokawa | 345/103 |
| 4,740,786 | 4/1988 | Smith | 345/3 |
| 4,778,260 | 10/1988 | Okada et al. | 345/97 |
| 4,816,816 | 3/1989 | Usui | 345/103 |
| 5,136,282 | 8/1992 | Inaba et al. | 345/97 |
| 5,297,286 | 3/1994 | Uehara | 395/651 |
| 5,384,579 | 1/1995 | Nakasuji et al. | 345/123 |
| 5,394,166 | 2/1995 | Shimada | 345/98 |
| 5,499,037 | 3/1996 | Nakagawa et al. | 345/89 |
| 5,512,915 | 4/1996 | Leroux | 345/55 |
| 5,523,773 | 6/1996 | Arakawa et al. | 345/98 |
| 5,537,650 | 7/1996 | West et al. | 395/750.06 |
| 5,581,772 | 12/1996 | Nanno et al. | 395/750.08 |
| 5,598,565 | 1/1997 | Reinhardt | 395/750.05 |
| 5,629,715 | 5/1997 | Zenda | 345/3 |
| 5,638,541 | 6/1997 | Sadashivaiah | 395/750.05 |

*Primary Examiner*—Meng-Ai T. An
*Assistant Examiner*—Sumati Lefkowitz
*Attorney, Agent, or Firm*—Finnegan, Henderson, Farabow, Garrett & Dunner, L.L.P.

[57] ABSTRACT

On one display panel, first and second display areas are provided. To display information on each area, an X-driver, a Y-driver, and an LCD controller are provided in each of the display areas. If a display cover is overlaid on the display panel, a predetermined switch is turned on. A CPU sends an instruction to a power supply controller in accordance with the ON-state of the switch. The power supply controller stops power supply to the X- and Y-drivers, and the LCD controller used in said first display area to save power by supplying power to drivers and controllers of a display area that is not covered.

15 Claims, 9 Drawing Sheets

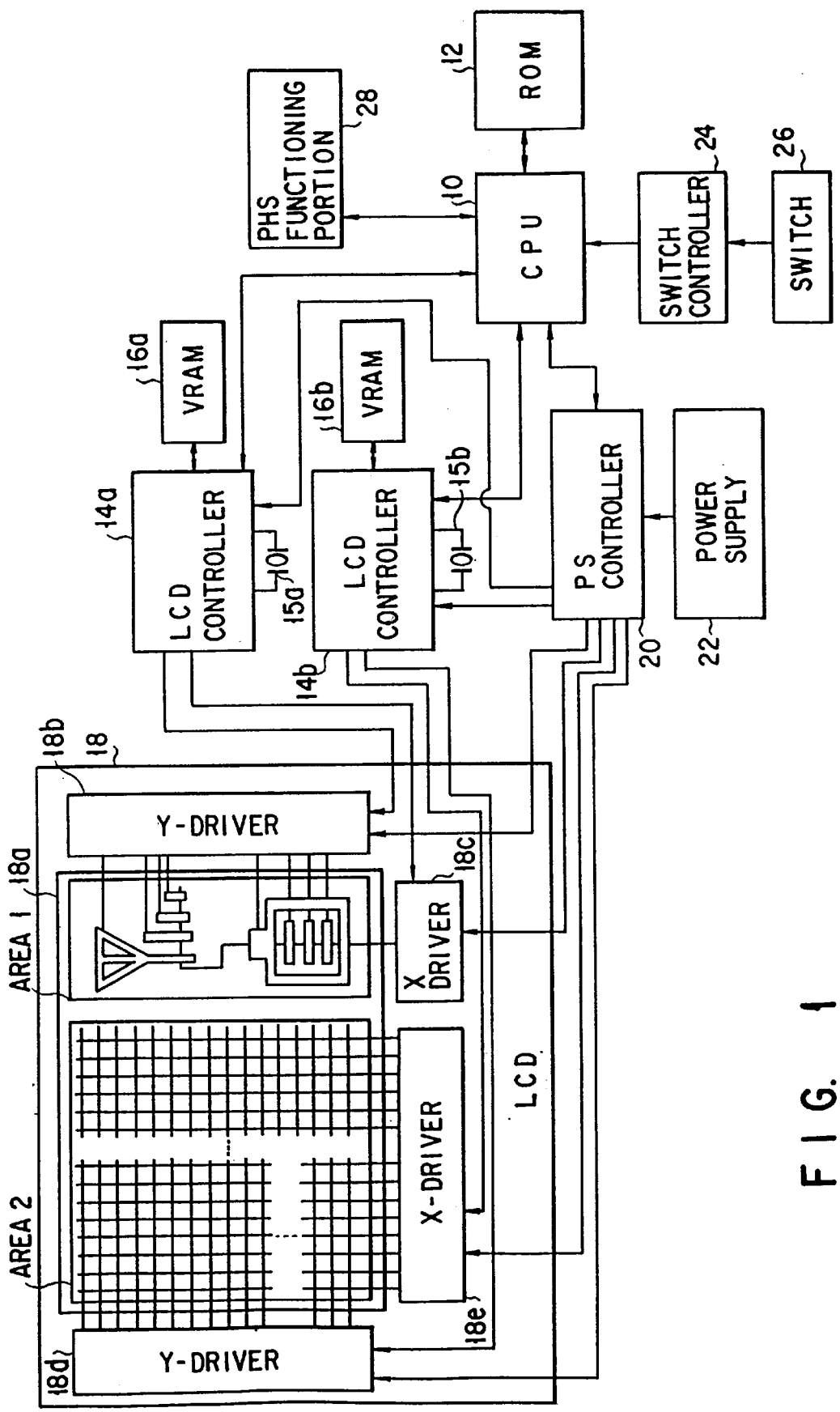
F I G. 1

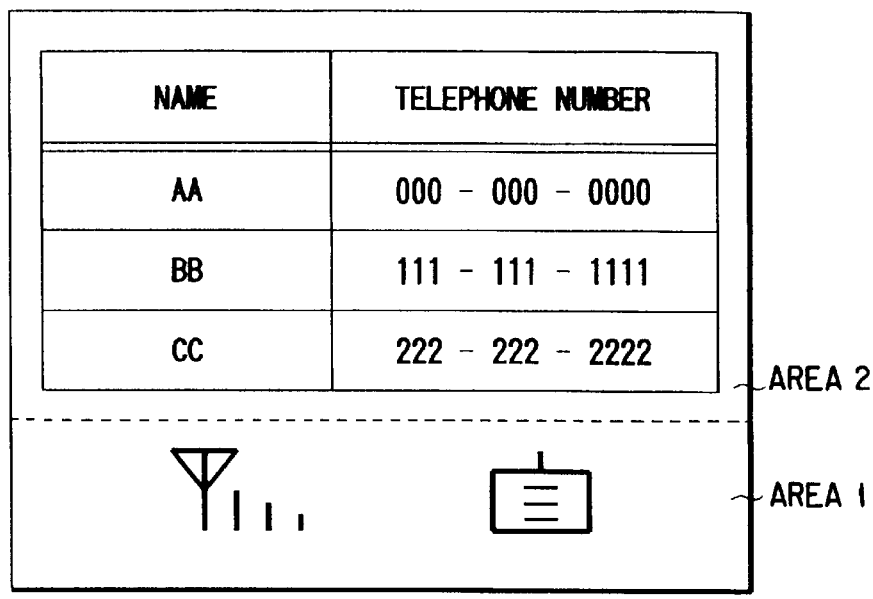
F I G. 4
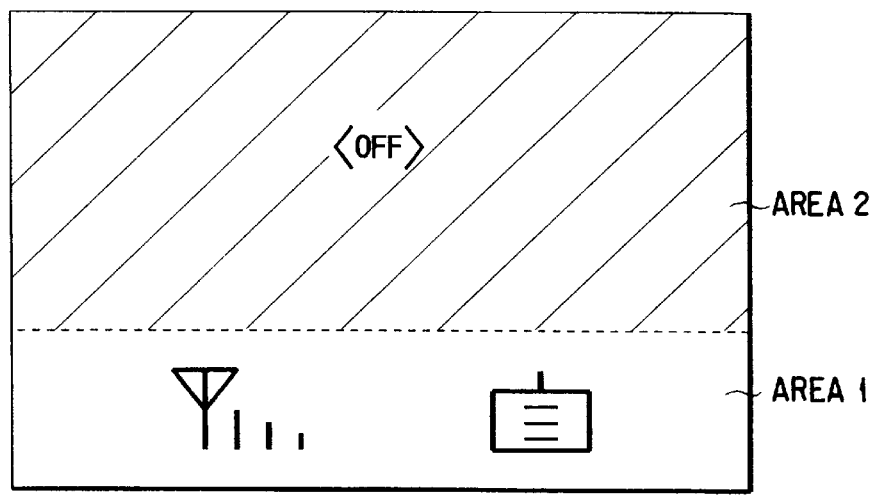
F I G. 5
F I G. 6A 
F I G. 6B 

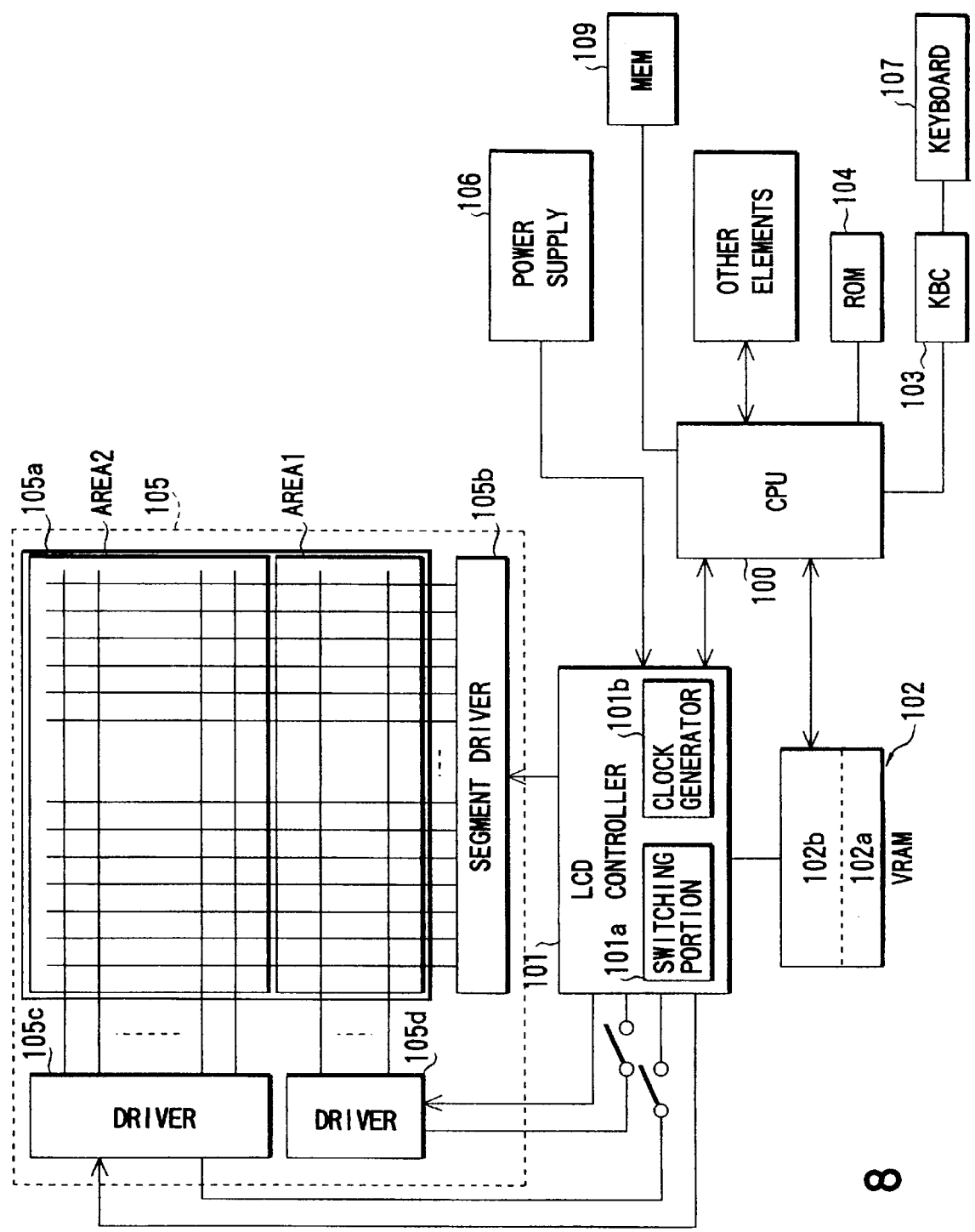
F I G. 8

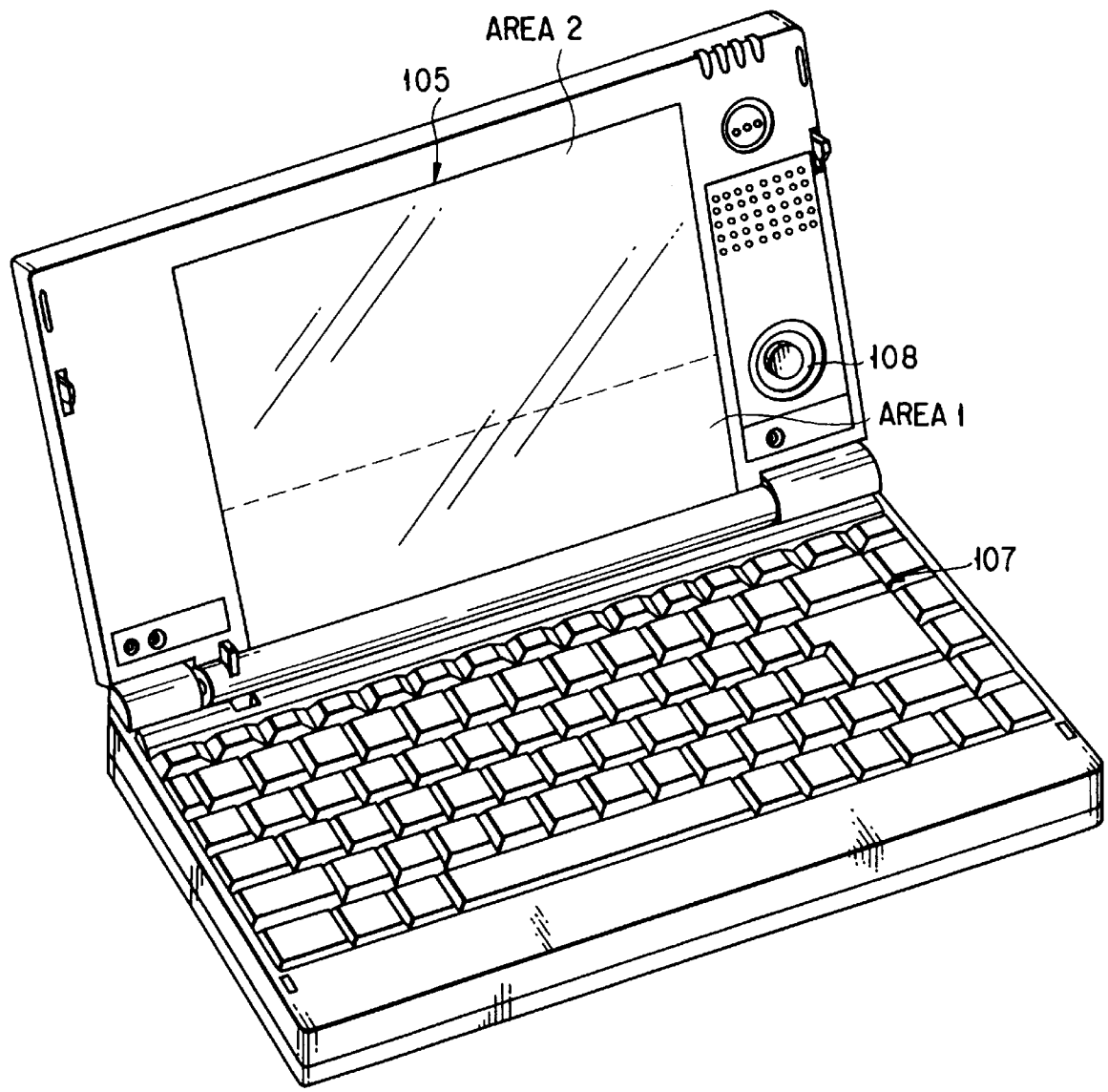
F I G. 9

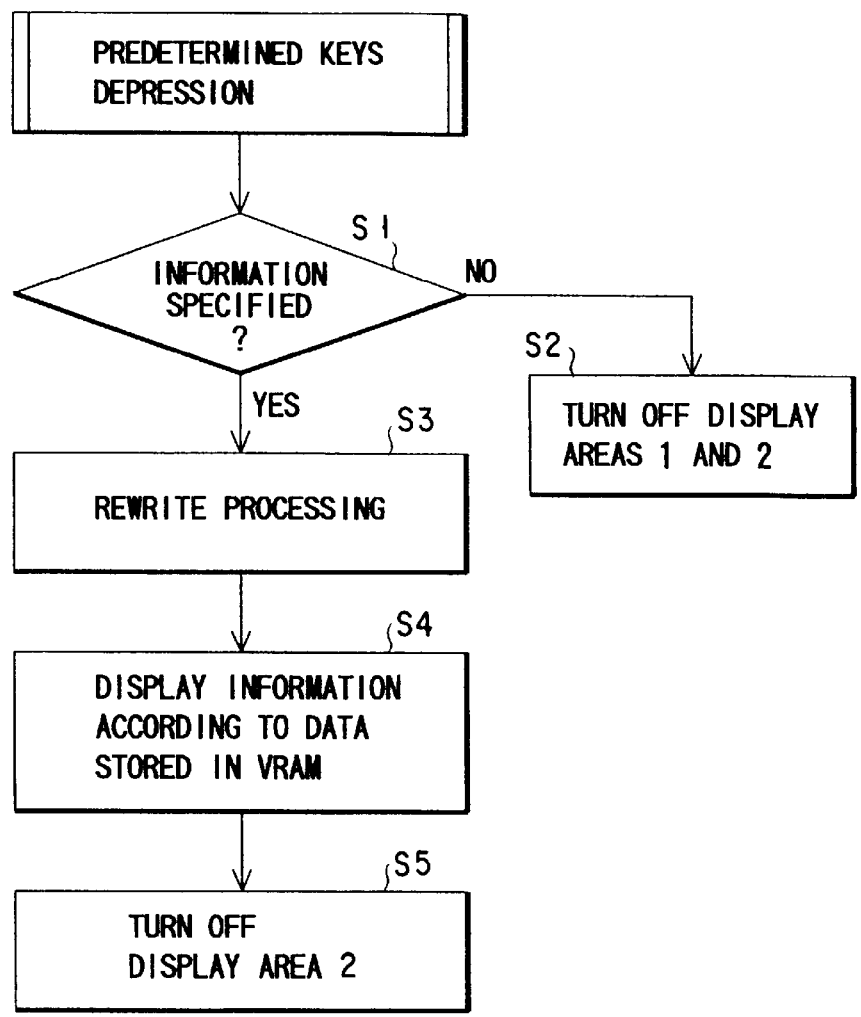
F I G. 10
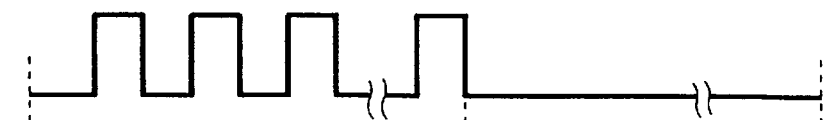
F I G. 11A
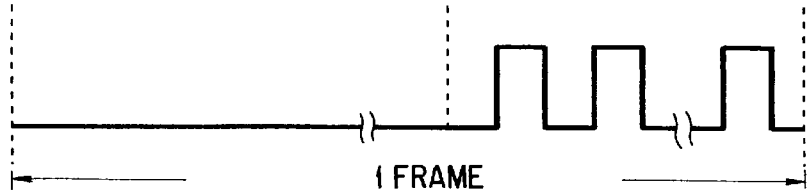
F I G. 11B
1 FRAME

|      NAME | TELEPHONE NUMBER |
|-----------|------------------|
| AAA       | 000 - 000 - 0000 |
| BBB       | 111 - 111 - 1111 |
| CCC       | 222 - 222 - 2222 |
| DDD       | 333 - 333 - 3333 |
| EEE       | 444 - 444 - 4444 |

105a

F I G. 12

⟨OFF⟩

| CCC | 222 - 222 - 2222 |
|-----|------------------|
| DDD | 333 - 333 - 3333 |

105a
AREA 2
AREA 1

F I G. 13

SELECTIVELY REMOVING POWER FROM MULTIPLE DISPLAY AREAS OF A DISPLAY UNIT

BACKGROUND OF THE INVENTION

1. Field of the Invention

The present invention relates to an information device having a display unit such as a liquid crystal display (LCD), etc., and particularly to an information device in which the display unit has a plurality of display areas and power consumption can be controlled by controlling the plurality of display areas.

2. Description of the Related Art

Generally, in a portable information device, the device having an LCD (liquid crystal display) is frequently used. Normally, in an information displaying method on the display unit, one system is provided with one LCD, and information is displayed on a screen of LCD when power is turned on. According to a conventional dot-matrix type LCD, one LCD unit has a pair of drivers for driving an electrode for a display in each of X- and Y-axis directions. At a power-on time, electric power is supplied to the driver for each of the axial directions, and the entire LCD screen is driven.

It is required that the handy type information device be used for a long period time by a battery driving. For this reason, displaying information by use of the display device is preferably restricted to the necessary minimum in order to reduce power consumption.

However, there is a case in which certain information must be always represented, depending on a function formed in the handy type information device. In this case, the entire display screen must be always driven to display information on the LCD display screen. For example, it is assumed that there is provided a function for notifying a residual amount of the battery in the information device. In this case, information for showing the residual amount of the battery must be always represented. Due to this, the LCD screen is always driven to display such information on the LCD display screen.

In this case, there can be considered the use of an LED (light-emitting diode). In general, however, electric power, which is necessary for driving the LED, is much larger than electric power, which is necessary for driving the LCD.

As mentioned above, in the conventional information device, the entire LCD display must be always driven to always display certain information on the screen. As a result, a large amount of power is consumed, and time for driving the information device using the battery is reduced.

SUMMARY OF THE INVENTION

An object of the present invention is to provide an information device in which a plurality of display areas is formed in a display unit and these display areas are controlled in accordance with an amount of information to be displayed so as to reduce power consumption.

According to a first aspect of the present invention, there is provided an information device comprising: a display panel having a first display area and a second display area; first driver means for displaying information on said first display area; second driver means for displaying information on said second display area; a first controller for controlling said first driver means; a second controller for controlling said second driver means; a cover attached to said information device to be rotatable; a switch for detecting that said cover is overlaid on said display panel; and power supply means for supplying power to said first and second driver means and said first and second controllers, and said power supply means for stopping power supply to said first driver means and said first controller in accordance with the detection by said switch.

According to a second aspect of the present invention, there is provided an information device comprising: a display panel having a first display area and a second display area; first driver means for displaying information on said first display area; second driver means for displaying information on said second display area; a controller for controlling said first and second driver means; a cover attached to said information device to be rotatable; a switch for detecting that said cover is overlaid on said display panel; and power supply means for supplying power to said first and second driver means and said first and second controllers, and said power supply means for stopping power supply to said first driver means in accordance with the detection by said switch.

According to a third aspect of the present invention, there is provided an information device comprising: a display panel having a first display area and a second display area; a common driver for driving lines in a vertical direction of said first and second display areas; a first driver for driving lines in a horizontal direction of said first display area; a second driver for driving lines in a horizontal direction of said second display area; a power supply for generating power to be output; a keyboard having a plurality of keys; detecting means for detecting a depression of a predetermined keys of said keyboard by an operator; a memory for storing display data; and a controller for supplying power to said common driver, and said first and second drivers, respectively, and for controlling said common driver, said first and second drivers in accordance with display data stored in said memory so as to be displayed, and for stopping power supply to said first driver in accordance with the detection of said detecting means.

According to the above information device, the display area on one display panel can be divided into a plurality of areas so as to selectively drive the respective areas as required. As a result, the display control can be carried out in accordance with an amount of information to be displayed, so that power consumption can be reduced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a block diagram showing the structure of the information device according to a first embodiment of the present invention;

FIG. 4 is a view showing one example of information displayed on the display panel of FIG. 1;

FIG. 5 is a view showing only a predetermined area of the display panel of FIG. 1;

FIGS. 6A and 6B are timing charts each showing a clock signal applied to the information device of FIG. 1;

FIG. 8 is a block diagram showing the structure of the information device according to a second embodiment of the present invention;

FIG. 9 is an outline view of the information device of FIG. 8;

FIG. 10 is a flow chart showing a display control operation of the information device of FIG. 8;

FIGS. 11A and 11B are timing charts each showing a clock signal applied to the information device of FIG. 8;

FIG. 12 is a view showing one example of information displayed on the display panel of FIG. 8; and FIG. 13 is a view showing only a predetermined area of the display panel of FIG. 8.

DETAILED DESCRIPTION OF THE PREFERRED EMBODIMENTS

Figure 2A:
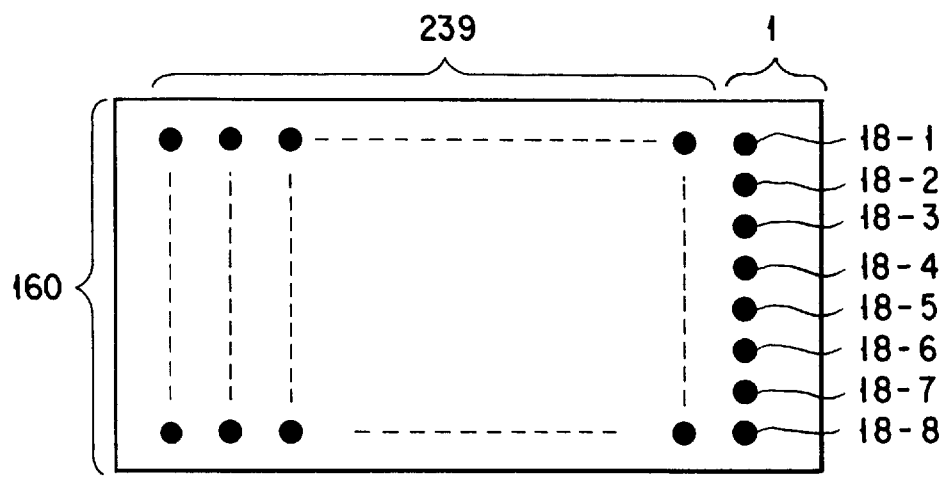
FIGS. 2A to 2C are views each explaining a display panel of FIG. 1.

Embodiments of the present invention will now be described with reference to the accompanying drawings.

A first embodiment, first, will be described.

FIG. 1 is a block diagram showing the structure of an information device of this embodiment. As shown in FIG. 1, the information device of this embodiment comprises a CPU 10, a ROM 12, LCD controllers 14a, 14b, VRAMs 16a, 16b, an LCD unit 18, a power supply controller 20, a power supply 22, a switch controller 24, a switch 26, and a PHS (personal handy phone system) functioning portion 28.

The CPU 10 executes a program in accordance with a program stored in the ROM 12 to control the entire information device.

The ROM 12 stores various kinds of data in addition to the program for defining the operation of the CPU 10. The program stored in the ROM 12 includes a SW program for controlling the LCD controllers 14 in accordance with a state of the switch 26 notified from the switch controller 24 and a power supply controller 20, and a program for controlling a data communication using the PHS functioning portion 28.

The LCD controllers 14a and 14b carry out a display control through the LCD 18 under the control of the CPU 10. The LCD controllers 14a and 14b drive drivers (to be described later) of the LCD unit 18 in accordance with display data stored in the VRAMs 16 so as to display information. The LCD controllers 14a and 14b turn on/off the drivers in accordance with notification from the CPU 10 so as to display only information of a specific area on the display screen. In the first embodiment, as shown in FIG. 1, two LCD controllers 14a and 14b are provided to carry out the display control of the two areas formed on the LCD unit 18a individually.

Also, crystal oscillators 15a and 15b are connected to the LCD controllers 14a and 14b, respectively. The crystal oscillators 15a and 15b generate clock signals having a different frequency to be supplied to the LCD controllers 14a and 14b, respectively. For example, the crystal oscillator 15a supplies the clock signal shown in FIG. 6B to the LCD controller 14a, and the crystal oscillator 15b supplies the clock signal shown in FIG. 6A to the LCD controller 14b.

The VRAMs 16a and 16b are connected to the LCD controllers 14a and 14b, respectively. The VRAMs 16a and 16b store display data to be displayed to the LCD unit 18. The VRAMs 16a and 16b are controlled by the LCD controllers 14a and 14b, respectively.

The LCD unit 18 is controlled to receive power supply by the power supply controller so as to display information under control of the LCD controllers 14a and 14b. The LCD 18 comprises a display panel 18a, a Y-driver 18b for an area 1, an X-driver 18c for an area 1, a Y-driver 18d for an area 2, and an X-driver 18e for an area 2. The display panel 18a is divided into areas 1 and 2, which are independently driven by the corresponding drivers. Specifically, the area 1 is driven by the drivers 18b and 18c, and the second area 2 is driven by the drivers 18d and 18e. The Y-driver 18b and X-driver 18c are driven by the LCD controller 14a, and the Y-driver 18d and X-driver 18e are driven by the LCD controller 14b.

As mentioned above, two display areas 1 and 2 are formed on the display panel 18a, which is the single panel. In the first embodiment, an annunciator for showing intensity of electric field and an annunciator for showing a residual amount of the battery are displayed on the area 1.

The power supply controller 20 supplies electric power from the power supply 22 to the respective parts constituting the information device including the LCD unit 18. The power supply controller 20 has a function of detecting the amount of power (residual amount of battery) stored in the power supply 20. If a voltage is decreased to a predetermined value, the power supply controller 20 notifies the decrease in voltage to the CPU 10, and controls the power supply to the predetermined drivers of the LCD unit 18.

The power supply 22 is a battery for storing electric power to be supplied to the respective parts constituting the information device including the LCD unit 18.

The switch controller 24 detects the on/off state of the switch 26. If the switch 26 is changed, that is, it is unnecessary to display information on the area 2 of the display panel 18a, the switch controller 24 notifies the state to the CPU 10.

The switch 26 is used to detect the state in which the information display on the area 2 is not needed. In this embodiment, the switch 26 is changed when an LCD cover 32 for covering the area 2 is closed. The on/off state of the switch 26 is detected by the switch controller 24, and the state is notified to the CPU 10.

The PHS functioning portion 28 is used to carry out a radio communication based on the standard of PHS. The PHS functioning portion 28 notifies data, which is received and transmitted through the radio communication, and intensity of electric field between the information device and a base station to the CPU 10.

Figure 2B:
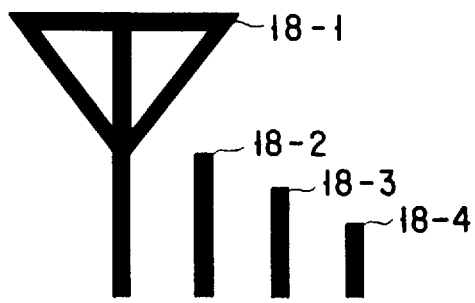
Figure 2C:
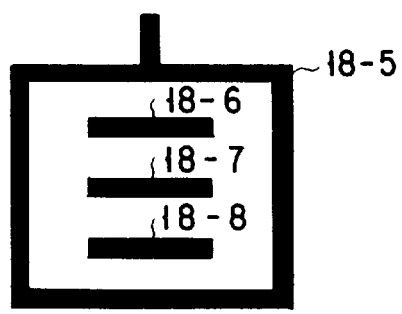

The following will explain information display on the areas 1 and 2 of the display panel 18a with reference to FIGS. 2A to 2C.

As shown in FIG. 2A, the area 2 of the display panel 18a is formed of 160 pixels in a vertical direction and 239 pixels in a horizontal direction. The Y-driver 18d controls 160 lines in the horizontal direction, and the X-driver 18e controls 239 lines in the vertical direction. The area 1 of the display panel 18a is formed of one pixel in a vertical direction and 8 pixels in a horizontal direction. In order to perform display controlling of one pixel, he Y-driver 18b controls 8 lines in a horizontal line, and the X-driver 18c controls one line in the vertical direction. In this case, the respective pixels of the area 2 have the same size. Then, a predetermined shape is allocated to the respective pixels of the area 1.

Predetermined shapes as shown in FIGS. 2B and 2C are allocated to the respective pixels 18-1 to 18-8 of the area 2. The shapes of the pixels 18-1 to 18-4 shown in FIG. 2B are provided to display the annunciator showing density of electric field. The shapes of the pixels 18-5 to 18-8 shown in FIG. 2C are provided to display the annunciator showing the residual amount of the battery.

An example of the outline of the information device to which the above-mentioned structure is applied will be described as follows.

Figure 3:
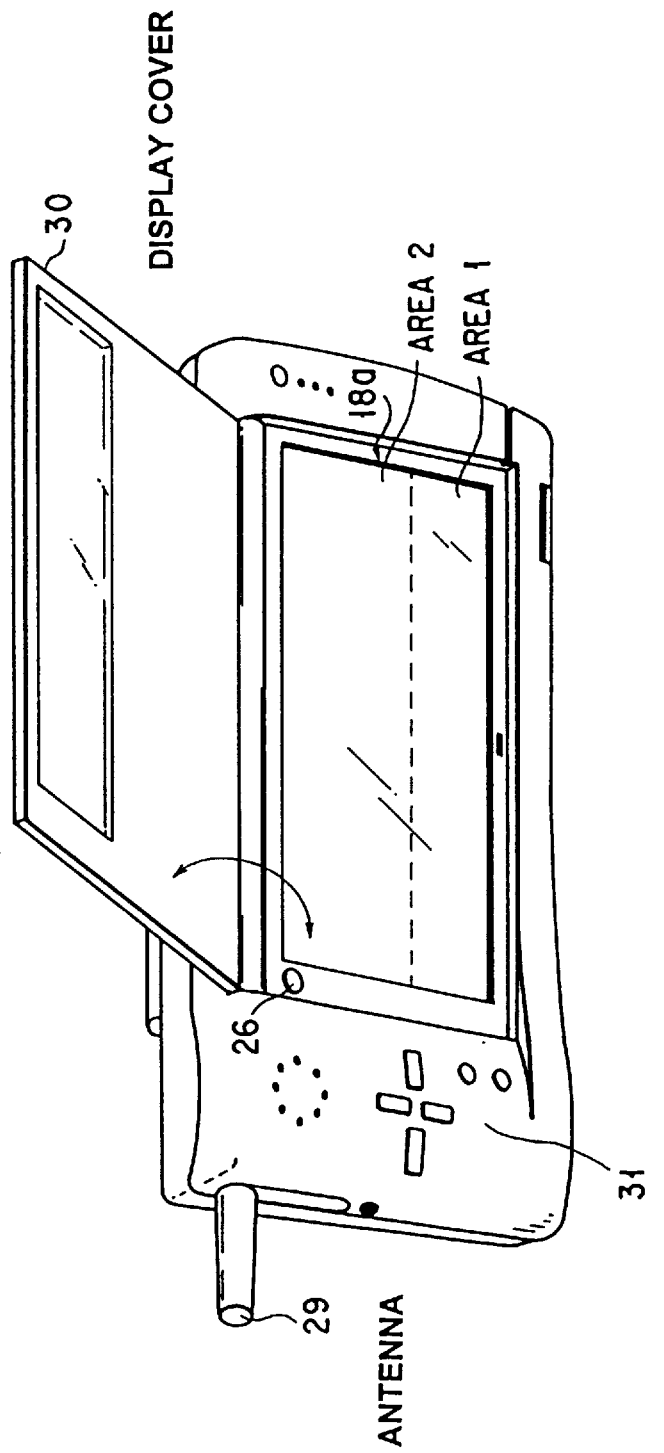
FIG. 3 is an outline view of the information device of FIG. 1.

FIG. 3 shows the outline of the information device to which the above-mentioned structure is applied. In the display device, there is provided an antenna 29 for realizing the PHS function. The antenna 29 is provided to be containable in the main body of the device. A display cover 30 is attached to the device to be rotatable by a hinge mechanism (not shown). The display cover 30 can rotate to overlay on the display panel 18a. At this time, the area 2 is covered with the display cover 30, and only the area 1 can be seen from the outer section. Or, the switch 26 is turned on when the cover 30 is overlaid on the display panel 18a. In the information device, a key set 31 for inputting an operator's instruction. However, the information device may be structured such that a manual input can be carried out with a predetermined pen.

An operation of the information device of this embodiment will be explained as follows.

In the information device of this embodiment, there are provided the function of displaying the intensity of electric field between the information device and the base station, and a function of displaying the residual amount of the battery stored in the power supply 22.

As shown in FIG. 4, the intensity of electric field and the residual amount of the battery are displayed on the area 1 formed on the panel 18a of the LCD unit 18. The CPU 10 outputs display data showing the residual of the battery through the LCD controller 14a in accordance with data notified from the power supply controller 20 to show the voltage value of the power supply 22 detected by the battery residual detecting function. The display data is stored in the VRAM 16a. Then, the display data is displayed on the display panel 18a. The CPU 10 outputs displayed data showing the density of the electric field through the LCD controller 14a in accordance with data notified from the PHS functioning portion 28 to show the density of electric field between the information device and the base station. The display data is stored in the VRAM 16a. Then, the display data is displayed on the display panel 18a.

The LCD controllers 14a and 14b control the drivers 18b, 18c and the drivers 18d, 18e so that the respective areas 1 and 2 of the display panel 18a are driven in accordance with the notification from the CPU 10. Since it is needed that the area 1 be always displayed (or standby state for PHS functioning portion 28), the LCD controller 14a drives the Y-driver 18b and the X-driver 18c in accordance with display data stored in the VRAM 16a (display data showing the residual of the battery, display data showing density of electric field).

For executing the general function of the information device, the LCD controller 14b drives the Y-driver 18d and the X-driver 18e to display information on the area 2. For example, as shown in FIG. 4, the LCD controller 14b dives the Y-driver 18d and the X-driver 18e to display a telephone book on the area 2.

The power supply controller 20 supplies power to the respective drivers, which are controlled by the LCD controllers 14a and 14b, and the LCD controllers 14a and 14b.

In a case where the general function of the information device is not used, the following operation can be executed.

Specifically, the LCD cover 30, which is attached to the main body of the device is closed to cover the display screen of the display panel 18a. The LCD cover 32 is attached to the main body of the device to be freely rotated from a close state to an open state. The close state corresponds to a position facing in parallel to the display panel 18a formed on an upper surface of the main body of the device. In this case, the end portion of the upper surface of the main body is set as a fulcrum. The open state corresponds to a position having a predetermined angle with a surface of the display panel 18a.

If the LCD cover 30 is placed at the position facing in parallel to the display panel 18, that is, the cover 30 is closed to cover the display screen of the display panel 18, only the area 2, which is a part of the panel 18a, is covered. In this state, the LCD cover 30 changes the state of the switch 26 provided on the upper surface of the main body of the device. The switch controller 24 detects that the switch 26 is changed and notifies the state of the switch 26 to the CPU 10.

The CPU 10 stops displaying information on the area 2 in accordance with the notification from the switch controller 24. In other words, the drive of each of the Y- and X-drivers 18d and 18e is stopped. Also, the CPU 10 designates the power supply controller 20 to stop the power supply to the Y- and X-drivers 18d and 18e, and the LCD controller 14b. An example of the display on the display panel 18a in this case is shown in FIG. 5.

Specifically, when the unnecessariness of displaying information on the area 2 is detected, only the area 1, which is necessary to be displayed, is continued to be displayed, the display on the area 2 is stopped. As a result, power consumption can be reduced. A high-voltage, for example, 20V or 40V, serving as a power supply for liquid crystal driving, is supplied to the respective drivers. Then, for example, 3.3V or 5.0V, serving as a logic power supply, is supplied to the LCD controllers. In the first embodiment, the power supply to the LCD controller 14b, Y- and X-drivers 18d, and 18e is stopped, so that power consumption can be largely reduced.

Moreover, the display drive of the area 2 is changed together with the open/close operation of the LCD cover 30, so that operability can be improved.

In the above explanation, the display change is intentionally carried out by, for example, closing the LCD cover 30 when there is no need of displaying information on the area 2, e.g., at the time when the PHS functioning portion 28 is set to a standby state for a radio communication and the function of the general information device is not used. It is, however, possible to automatically carry out the display change in accordance with the residual amount of the battery of the power supply 22.

The power supply controller 20 detects the residual amount of the battery of the power supply 22 by comparing the residual amount of the battery with a predetermined voltage value with use of the battery residual detecting function. When the power supply controller 20 detects that the voltage value is decreased to the predetermined voltage value, the result is notified to the CPU 10.

In this case, the predetermined voltage value means the residual amount of the battery with which can drive not the entire surfaces of the areas 1 and 2 but a part of the display area. Or, the predetermined voltage value means the residual amount of the battery with which can execute the function for a short period of time.

The CPU 10 normally ends the current executing function (program) in accordance with the SW program stored in the ROM 12. Also, the CPU 10 stops the display drive of the area 2 through the LCD controller 14b in accordance with the notification from the power supply controller 20. The power supply controller 20 stops the power supply to each of the Y- and X-drivers 18d and 18e, and the LCD controller 14b.

Thus, information display on the area 1 can be continued to some extent.

In the above-mentioned embodiment, the LCD unit 18 was provided as a display device in the information device. However, the same display driving method can be used even in the information device using the other display unit.

Moreover, the above embodiment explained that the state of the switch 26 was changed by closing the LCD cover 30. However, the state of the switch 26 may be changed by any means, e.g., a manual method. Also, the display drive of the area 2 may be changed through the LCD controllers 14 by the programs executed by not the mechanical switch but the CPU 10.

In the above-mentioned embodiment, the area 1 was used as an area for information to be always displayed (intensity of electric field, residual amount of the battery). However, the entire surface of the display panel 18a including the areas 1 and 2 may be used as a display for executing the function of the information device, and specific information may be displayed on only the area 1 as required.

Moreover, the above embodiment explained that the display panel 18a was divided into two areas 1 and 2, so that the display of the area 2 was selectively stopped. However, the number of the areas is not limited to two. Three or more areas may be formed, and the X- and Y-drivers corresponding to the respective areas may be formed. Then, the display control and the power supply control of each area can be carried out.

In the above-mentioned embodiment, the LCD cover 30 was shaped to cover only the area 2. However, the LCD cover 30 may be shaped to cover the entire surface of the panel 18a so that only a part corresponding to the area 1 is transmitted through the display area so as to be visually conformed.

Moreover, in the above-mentioned embodiment, information displayed on the area 1 is not, of course, limited.

Figure 7:
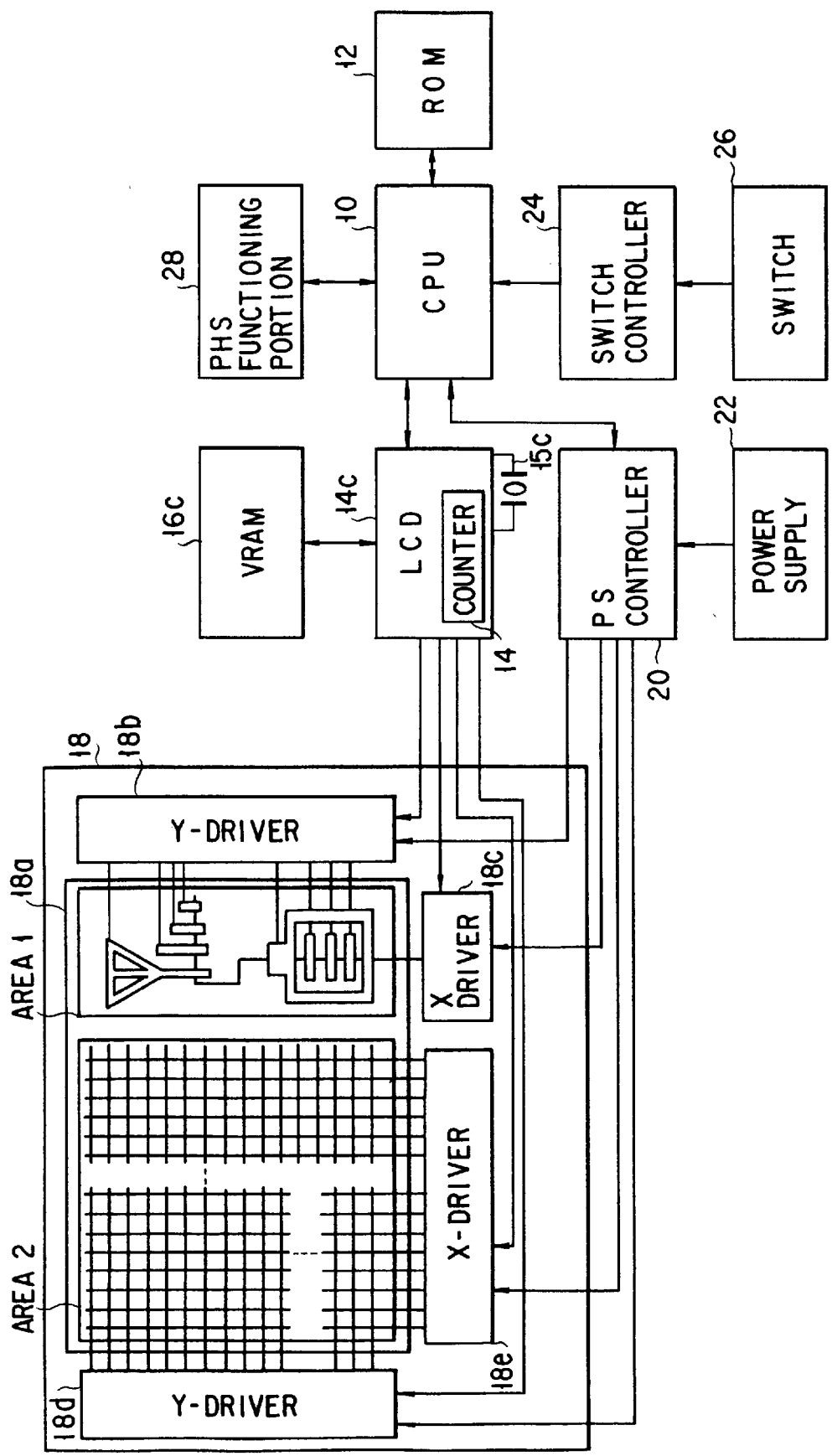
FIG. 7 is a view showing the structure of the modification of the information device of FIG. 1.

The following will explain a modification of the first embodiment with reference to FIG. 7.

The information device shown in FIG. 7 is structured to have one LCD controller is used in place of two LCD controllers of FIG. 1. In FIG. 7, the same reference numerals as the case of the first embodiment are added to the portions common to the first embodiment.

A crystal oscillator 15c and a VRAM 16c are connected to an LCD controller 14c. The LCD controller 14c has a counter 141 built-in. The LCD controller 14c counts the clock signal having a predetermined frequency, which is supplied from the crystal oscillator 15c, thereby generating the clock signals shown in FIGS. 6A and 6B. The drivers 18b and 18c, and the drivers 18d and 18e are individually controlled in accordance with the generated different clock signals. The clock signals shown in FIGS. 6A and 6B indicate timing to control the LCD drivers 18b, 18c, 18d and 18e for convenience of explanation. The waveforms of the clock signals shown in FIGS. 6A and 6B differ from actual waveforms.

In this modification, when the cover 30 is closed, the power supply to the drivers 18b and 18c are stopped from the power supply controller 24. As a result, the power supply for the liquid crystal drive can be saved.

As mentioned above, according to the present invention, the display area is divided into the plurality of areas on the same display panel, so as to selectively display each area as required. As a result, the display can be controlled in accordance with the amount of information to be displayed, thereby making it possible to reduce the power consumption.

Next, the following will explain a second embodiment of the present invention with reference to the drawings.

The structure of the LCD control of the information device of the second embodiment is shown in FIG. 8, and the outline is shown in FIG. 9. The information device shown in FIGS. 8 and 9 is a small-sized portable computer having a size and a weight enough to be mounted on the palm of the operator's hand.

A CPU 100 is connected to the various kinds of structural elements of the information device to control the entire information device. The CPU 100 is connected to the an LCD controller 101, a VRAM 102, a keyboard controller (KBC) 103, a ROM 104, and the other structural elements such as a system memory.

The LCD controller 101 is connected to the VRAM 102, segment drivers 105b, 105c, and 105d. The LCD controller 101 controls various kinds of processing for display data and the drive of each of the drivers 105b to 105d in order to display information of on a display panel 105a of an LCD unit 105. The LCD controller 102 has a switch portion 101a, and a clock generator 101b built-in. The clock generator 101b generates a clock signal having a predetermined frequency to be supplied to the switch 101a. The switch 101a changes the received clock signal by a predetermined timing so as to generate a clock signal shown in FIGS. 11A and 11B.

The LCD controller 101 controls the driver 105c by the timing of the clock signal shown in FIG. 11A. Also, the LCD controller 101 controls the driver 105d by the timing of the clock signal shown in FIG. 11B. It is noted that the LCD controller 101 controls the driver 105b by the timing of the clock signal, which is not yet changed by the switch 101a, that is, the timing of the clock signal generated by the clock generator 101b.

The LCD controller 101 is connected to a power supply (battery) 106. The LCD controller 101 inputs power for driving from the power supply 106. The LCD controller also inputs power for drivers 105b to 105d, the so-called driving power for liquid crystal so as to be supplied to the drivers 105b to 105d. The LCD controller 101 turns on/off the power supply for liquid crystal under the control of the CPU 100. For example, the power supply to the drivers 105c and 105d is individually controlled in accordance with the control of the LCD controller 101. As a result, the LCD controller 101 drives both the drivers 105c and 105d so as to display information on the two areas 1 and 2 as shown in FIGS. 8 and 9. Or, the LCD controller 101 drives only the driver 105c or 105d so as to display information on only the area 1 or 2. In the second embodiment, the information device is structured such that only the area 1 can be separately displayed. Then, for displaying information on only the area 1, the power supply to the driver 105c is stopped.

The VRAM 102 stores display data of information to be displayed on the display panel 105a. The VRAM 102 has a storage area 102a for an area 1 and a storage area 102b for an area 2.

The KBC 103 is connected to a keyboard 107. The KBC 103 inputs an operator's instruction due to the depression of the key of the keyboard 107, and notifies the instruction to the CPU 100. If the KBC 103 detects that an Fn key and any one of function key are simultaneously depressed, the KBC 103 recognizes the detected result as a depression of a hot-key to be notified to the CPU 100. The CPU 100 controls the LCD controller 101 to display only the area 1 in accordance with the depression of the hot-key.

It is noted that the information device of this embodiment has a pointing device 101 (FIG. 9) in addition to the keyboard as an device for inputting the operator's instruction.

The ROM 104 stores a program, which is necessary to the operation of the CPU 100. A memory (MEM) 109 stores various kinds of programs, which are necessary for the operation of the information device, and data. In the second embodiment, in the case of displaying only the area 1, the memory 109 stores data whether or not data instructing from the operator is designated in advance. If such data is designated, the memory 109 stores designating data showing which information is displayed.

Next, the following will explain an operation of the display control of the information device of the second embodiment with reference to FIGS. 10, 12, and 13.

When power is supplied to the information device in the normal use, the LCD controller 101 supplies power to the drivers b to d so as to display, e.g., a telephone book, on the areas 1 and 2 of the display panel 105a. In this case, if the Fn key and a predetermined function key is depressed, the KBC 103 notifies the depression of the hot-key to the CPU 100. The CPU 100 reads designation data of the memory 109 in accordance with the notification of the depression of the hot-key.

If designation data shows that no display information onto the area 1 is designated (step S1, NO), the CPU 100 designates the LCD 101 to stop the power supply to the drivers b to d. As a result, the areas 1 and 2, that is, the display processing of the entire surface of the display panel 105 is stopped (step S2). In this case, the power supply of the entire information device is not turned off. In other words, only the power supply to the LCD unit 105 is stopped.

If the read designation data shows that names CCC and DDD, and telephone numbers of CCC and DDD are to be displayed on the area 1 as shown in FIG. 12 (step S1, YES), the CPU 100 executes a rewriting processing of display data stored in the VRAM 102 (step S3). In the rewriting processing, the CPU 100 writes data of the names CCC and DDD, and the telephone numbers of CCC and DDD, that is, display data, which corresponds to information enclosed by a thick line of FIG. 12, to the storage area 102a.

Thereafter, the LCD controller 101 displays information on the display panel 105a in accordance with display data stored in the VRAM 102, and stops the power supply to the drivers 105c (steps S4 and S5). Thereby, information as shown in FIG. 13 is displayed on the area 1, and no information is displayed on the area 2.

As mentioned above, according to the second embodiment, two display areas are formed on one display panel. Then, only necessary information is displayed on a predetermined area in accordance with the operation of the hot-key by the operator. As a result, power, which is necessary to display information on the other area, can be saved. Thus, the second embodiment can obtain the same advantage as the case of the first embodiment.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An information device comprising:

a display panel having a first display area and a second display area for separately displaying information different from each other;

a cover for covering at least part of said display panel, in which an operator is capable of viewing said first display area and not capable of viewing said second display area when said cover is overlaid on said display panel; and means for controlling such that information is not displayed on said second display area by stopping power to said second display area and information is displayed on said first display area when said cover is overlaid on said display panel.

2. An information device according to claim 1, further comprising a battery, said controlling means stopping power supplied from said battery to said second display area.

3. An information device according to claim 1, further comprising means for carrying out a radio communication, said first display area for displaying information regarding said radio communication.

4. An information device according to claim 3, wherein said first display area displays information indicative of an intensity of an electric field between said information device and a base station using said means for carrying out a radio communication.

5. An information device according to claim 2, wherein said first display further displays information indicating an amount of charge remaining in said battery.

6. An information device according to claim 2, further comprising means for stopping power supplied to said second display area in accordance with an amount of charge remaining in said battery.

7. An information device according to claim 1, further comprising a switch for detecting that said cover is overlaid on said display panel, said controlling means stopping the displaying on said second display area in response to said switch.

8. An information device according to claim 1, further comprising driver means, controlled by said controller means, for displaying information on said second display area, wherein power supplied to said driver means and said controller means is stopped when said cover is overlaid on said display panel.

9. An information device comprising:

a display panel having a first display area and a second display area for separately displaying information different from each other;

means for carrying out a radio communication, said first display area for displaying information indicative of an intensity of an electric field between said information device and a base station using said means for carrying out a radio communication;

a cover for covering at least part of said display panel, such that an operator is capable of viewing said first display area and not capable of viewing said second display area when said cover is overlaid on said display panel; and means for controlling such that information is not displayed on said second display area by stopping power to said second display area and the information indicative of the intensity of the electric field is displayed on said first display area when said cover is overlaid on said display panel.

10. An information device according to claim 9, wherein the intensity of the electric field is represented on said first display area by an annunciator including a plurality of pixels each having a predetermined shape.

11. An information device according to claim 9, wherein said first display area further displays information indicating an amount of charge remaining in a battery provided in said information device.

12. An information device comprising:

a display panel having a first display area and a second display area for separately displaying information different from each other; a cover for covering at least part of said display panel, in which an operator is capable of viewing said first display area and not capable of viewing said second display area when said cover is overlaid on said display panel;

means for specifying by an operator in advance, part of the information displayed on said first and second display areas; and means, responsive to an instruction by an operator, for controlling such that information is not displayed on said second display area by stopping power to said second display area and causing said first display area to display the information specified by the operator.

13. An information device according to claim 12, further comprising means for carrying out a radio communication, said first display area displaying information regarding said radio communication.

14. An information device according to claim 12, wherein said first display area displays information indicative of an intensity of an electric field between said information device and a base station.

15. An information device according to claim 12, wherein said first display area displays information indicating an amount of charge remaining in a battery provided in said information device.

* * * * *